(12) United States Patent
Tanaka

(10) Patent No.: US 8,823,735 B2
(45) Date of Patent: Sep. 2, 2014

(54) INFORMATION PROCESSING APPARATUS AND TELECONFERENCE SYSTEM

(75) Inventor: Sachio Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 843 days.

(21) Appl. No.: 13/005,679

(22) Filed: Jan. 13, 2011

(65) Prior Publication Data

US 2011/0175929 A1    Jul. 21, 2011

(30) Foreign Application Priority Data

Jan. 18, 2010   (JP) ................................. 2010-008379

(51) Int. Cl.
  *G09G 5/00*   (2006.01)
  *G06T 11/20*  (2006.01)
  *G06F 3/00*   (2006.01)
  *G06F 15/16*  (2006.01)
  *G06F 17/00*  (2006.01)

(52) U.S. Cl.
  USPC ........... 345/629; 345/441; 345/442; 345/443; 345/619; 715/211; 715/753; 709/205

(58) Field of Classification Search
  CPC ......... G06F 3/01; G06F 3/048; G06F 3/0481; G06F 3/04842; G06F 3/04845; G06F 3/0487; G06F 3/0488; G06F 3/04883; G06T 11/00; G06T 11/20; G06T 11/203; G06T 11/60; G06T 11/80
  USPC ......... 345/156, 168, 173, 179–180, 441–443, 345/467–468, 10–17, 619, 629, 633–637, 345/699; 382/177–178, 190, 202; 709/200, 709/203–205, 213, 217–219; 715/200, 211, 715/273, 700, 748, 753, 761, 764
  See application file for complete search history.

(56) References Cited

U.S. PATENT DOCUMENTS

| | | | | |
|---|---|---|---|---|
| 2002/0078088 | A1* | 6/2002 | Kuruoglu et al. | 707/512 |
| 2006/0050969 | A1* | 3/2006 | Shilman et al. | 382/224 |
| 2007/0214407 | A1* | 9/2007 | Bargeron et al. | 715/512 |
| 2007/0219981 | A1 | 9/2007 | Takaai et al. | |
| 2010/0251189 | A1* | 9/2010 | Jaeger | 715/863 |
| 2010/0328316 | A1* | 12/2010 | Stroila et al. | 345/441 |

FOREIGN PATENT DOCUMENTS

| | | | |
|---|---|---|---|
| CN | 101031063 | A | 9/2007 |
| JP | 6-105045 | A | 4/1994 |
| JP | 7-281971 | A | 10/1995 |
| JP | 8-36546 | A | 2/1996 |
| JP | 11-149282 | A | 6/1999 |
| JP | 2002-41206 | A | 2/2002 |

* cited by examiner

*Primary Examiner* — Ke Xiao
*Assistant Examiner* — Jed-Justin Imperial
(74) *Attorney, Agent, or Firm* — Birch, Stewart, Kolasch & Birch, LLP

(57) ABSTRACT

The document data (e.g., conference materials) are transmitted from a conference server apparatus to a terminal apparatus 3 attending a teleconference, and the terminal apparatus 3 utilizes a displaying unit 46 to display the document data on the lower layer, utilizes a accepting unit 45 (e.g., a pen tablet or a mouse) to accept a writing operation performed on the display screen, generates a write-image regarding the writing operation on a layer upper than the lower layer, and displays and overlays the generated write-image on the document data. At that time, the terminal apparatus 3 sets a rectangular write-inhibition area containing character or word included in the sentence of document data. For example, when a leader line is written inside the write-inhibition area, an image regarding the written leader line is displayed outside the write-inhibition area.

13 Claims, 16 Drawing Sheets

DOCUMENT DATA

企画書の作り方は、現在の問題点や改善点に
関して、過去、現在のデータを駆使し未来を予
想させるのが企画書の書き方です・・・

USER'S WRITING OPERATION

企画書の作り方は、現在の問題点や改善点に
関して、過去、現在のデータを駆使し未来を予
想させるのが企画書の書き方です・・・

FIG. 5A
DOCUMENT DATA
企画書の作り方は、現在の問題点や改善点に関して、過去、現在のデータを駆使し未来を予想させるのが企画書の書き方です・・・
FIG. 5B
USER'S WRITING OPERATION
企画書の作り方は、現在の問題点や改善点に関して、過去、現在のデータを駆使し未来を予想させるのが企画書の書き方です・・・
FIG. 5C
REDRAWING OF WRITE-IMAGE
企画書の作り方は、現在の問題点や改善点に関して、過去、現在のデータを駆使し未来を予想させるのが企画書の書き方です・・・

FIG. 6A

WRITE-INHIBITION AREA SET FOR EACH CHARACTER

WRITE-INHIBITION AREA SET FOR EACH WORD

企画書の作り方は。現在の問題点や改善点に関して。過去。現在のデータを駆使し未来を予想させるのが企画書の書き方です・・・

F I G. 1 0 A
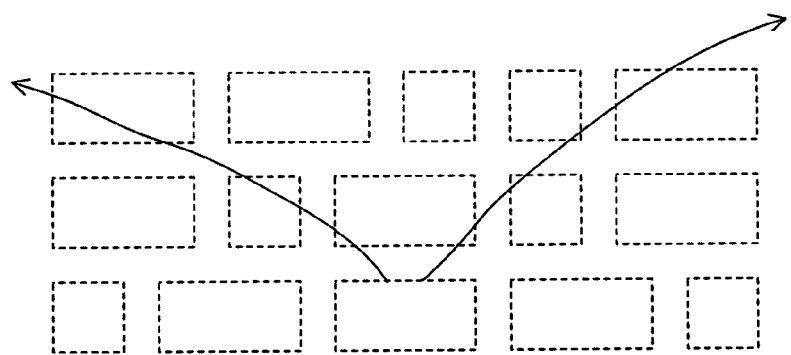
F I G. 1 0 B
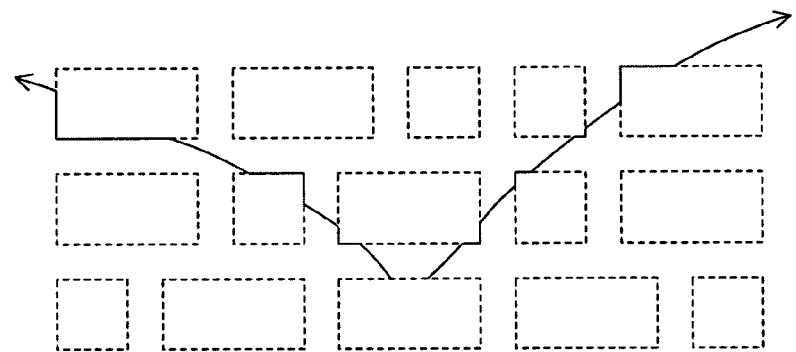

INFORMATION PROCESSING APPARATUS AND TELECONFERENCE SYSTEM

CROSS-REFERENCE TO RELATED APPLICATION

This Nonprovisional application claims priority under 35 U.S.C. §119(a) on Patent Application No. 2010-008379 filed in Japan on Jan. 18, 2010, the entire contents of which are hereby incorporated by reference.

BACKGROUND OF THE INVENTION

1. Field of the Invention

The present invention relates to an information processing apparatus and a teleconference system for conducting a conference through a network with plural users even who stay away from each other.

2. Description of Related Art

It is possible, owing to the recent developed network technique, to transmit large data (e.g., moving image data and voice data) between plural terminal apparatuses even which are respectively located at separated two or three places. These terminal apparatuses are utilized for implementing a teleconference system in which users staying far way from each other can attend a conference. Such a teleconference system has been implemented, already.

In recent teleconference system, it is possible to share document data with plural terminal apparatuses. Thus, when a user attends a teleconference, the user can access such share-document data. In addition, when a user attends a teleconference, the user can utilize a terminal apparatus to perform some processing on such share-document, such as providing additional information into such share-document data or editing such share-document data. Some teleconference system is known to make it possible to share the results of performed processing with plural terminal apparatuses for allowing plural users to access the results of performed processing, too.

For example, Japanese Patent Application Laid-Open No. 7-281971 proposes an electronic conference apparatus including a displaying unit that has a common display area which shows an object (such as a figure and a character), input from another apparatus connected through a network, including an input controlling unit that adds a writing level representing depth to input data, and displaying the object (such as a figure and a character) at virtual depth position based on the writing level. This electronic conference apparatus may display an object (such as a figure and character) readable for users of plural apparatuses connected on the same network, and can provide a conference having higher effectiveness of operation.

For example, Japanese Patent Application Laid-Open No. 8-36546 proposes a cooperation-work support system including a share-application managing unit that distributes input operation and all of output display to be shared, for an application executed on a computer window system, and a share-transparent-board managing unit that has a function for directly overlaying a transparent board in which an annotation message and a draw regarding the focus of argument onto a display area. This cooperation-work support system may avoid the interruption of intellectual operation and physical operation caused by the failure of immediacy and continuity in a communication, may integrally distribute a matter for argument, a focus of argument and an annotation message to be shared, and may contribute to facilitating a cooperation work and improving the efficiency of cooperation work.

For example, Japanese Patent Application Laid-Open No. 11-149282 proposes a teleconference system in which plural virtual conference terminal apparatuses are connected to a central processing apparatus through a communication line. Additionally, in the proposed teleconference system, the central processing apparatus includes plural pre-combination white boards, each virtual conference terminal apparatus can select one of the plural pre-combination white boards for writing an object, these pre-combination white boards can be combined as required to make a combined image, and the combined image can be displayed. It may not be necessary for this teleconference system to take care of interference on previous writing, although white boards are shared with plural users. In addition, it may be possible to prevent the displayed image from being unreadable due to much information written on the white boards.

SUMMARY OF THE INVENTION

The electronic conference apparatus proposed by Japanese Patent Application Laid-Open No. 7-281971 displays an object having higher priority on the foreground and an object having lower priority on the background. Thus, when an area of displayed object is overplayed on an area of another displayed object, a user may not see a part or all of object displayed on the background due to the overlay of background-displayed object with the foreground-displayed object. And, the cooperation-work support system proposed by Japanese Patent Application Laid-Open No. 8-36546 adds an object, such as an annotation message and a draw regarding the focus on argument, onto the transparent board, and then overlays the transparent board directly on the display area for applications. Thus, a user may not see a part or all of application displayed on the display area due to the overlay of displayed application with the object added on the transparent board.

Even when a part or all of written image is overlaid by another image, the teleconference system proposed by Japanese Patent Application Laid-Open No. 11-149282 may select a proper combination of pre-combination white boards to be combined and displayed, and then a user may see the image to be overlaid. However, it may be difficult for the user to select such a proper combination of plural pre-combination white boards. As the number of pre-combination white boards is increased, it becomes difficult for the user to select such a proper combination.

When a user adds an postscript, such as memo, to data of document displayed on a display screen of terminal apparatus in the system described above that can overlay and display an object, such as a image written by a user, especially when the user adds data of line, such as a leader line, onto a word document, the added line is overlaid on the word document in the displayed image. Therefore, it may be difficult to read the word document in the displayed image. In the teleconference system that plural users share contents of added postscript, the postscript added by a user may overlay on a part of shared document utilized by other user. Therefore, said other user may feel the postscript-added shared image quite unreadable. These problems are not well solved by the attempts of Japanese Patent Application Laid-Open No. 7-281971, Japanese Patent Application Laid-Open No. 8-36546, and Japanese Patent Application Laid-Open No. 11-149282.

The present invention is made in view of such circumstances and has an object to provide an information processing apparatus and a teleconference system for preventing a readability of word document from being reduced even when a user adds a postscript, such as a memo, onto the data of word document.

According to the present invention, a write-inhibition (write-protect) area is set for a word document represented by document data. Therefore, it is possible to prevent a word document from being overlaid on written image, and thus to prevent the readability of word document from being reduced. In addition, an aspect of the present invention not only simply inhibits a user from writing inside the write-inhibition area, but also makes the written image in response to writing operation for the write-inhibition area become displayed around and outside the write-inhibition area. Hence, a user can perform writing operation even without knowing the presence of write-inhibition area, and the image written inside the write-inhibition area can be automatically displayed outside of the write-inhibition area. Therefore, the information processing apparatus according to the present invention can facilitate and assure the writing operation for document data performed by a user, and can prevent the readability of word document represented by document data into which a user has added some written image.

The above and further objects and features of the invention will more fully be apparent from the following detailed description with accompanying drawings.

BRIEF DESCRIPTION OF THE DRAWINGS

FIG. 5A, FIG. 5B and FIG. 5C are schematic views showing examples about writing operation performed by a user.

FIG. 6A and FIG. 6B are schematic views showing examples of write-inhibition area.

FIG. 10A and FIG. 10B are schematic views to explain redrawing a line written over the write-inhibition area.

DESCRIPTION OF THE PREFERRED EMBODIMENTS

Figure 1:
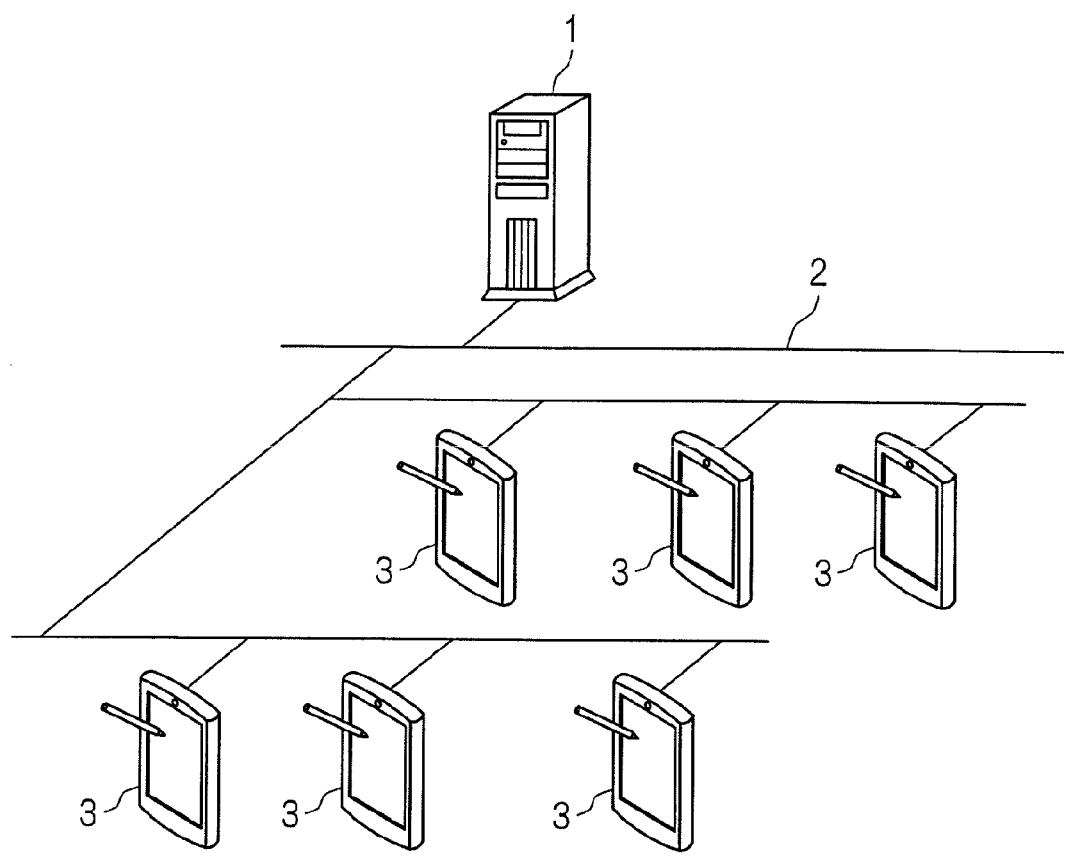
FIG. 1 is a schematic view showing an example configuration of teleconference system according to the present invention.

Hereinafter, an embodiment of the present invention is described in detail with reference to figures. FIG. 1 is a schematic view showing an example configuration of teleconference system according to the present invention. An item number "1" in the figures indicates a conference server apparatus included in the teleconference system, and the conference server apparatus is connected to plural terminal apparatuses 3, 3, . . . through a network 2. The conference server 1 can relay several types of data (such as moving image data, voice data, and static image data) transmitted between two terminal apparatuses 3, 3 that are arbitrary selected from the plural terminal apparatuses 3, 3, . . . connected to the network 2, and thus can implement a teleconference (TV conference) between remote places.

As connected to the conference server apparatus 1 and the plural terminal apparatuses 3, 3, . . . , the network 2 may be an office LAN (Local Area Network) provided in a company that opens a conference, or may be a public telecommunication network, such as an internet. The terminal apparatus 3 can perform authentication with the conference server apparatus 1, a terminal apparatus 3 having an authentication of access can receive data from the conference apparatus 1 and can output a moving image, a voice, a static image and the like based on the received data, and thus it is possible to implement a teleconference where the moving image, the voice, the static image and the like can be shared with the terminal apparatus 3 and another terminal apparatus 3.

The conference server apparatus 1 implements plural teleconferences in parallel, too. The conference server apparatus 1 can treat a plurality of terminal apparatuses 3, 3, . . . as a group, can allow to relay transmission of data regarding a moving image, a voice, a static image and the like between the plurality of terminal apparatuses 3, 3, . . . treated as one group, can generate plural groups in the network, and thus can relay data simultaneously in the plural groups.

The terminal apparatus 3 included in the teleconference system may be a pen tablet type device having a displaying unit and an accepting unit, and including a camera, a microphone and a communication function. However, the terminal apparatus 3 is not limited to the configuration described above. For example, the terminal apparatus 3 may be a note type PC (personal computer) including a camera and a speaker, or may be a display device including a camera and a communication function. The terminal apparatus 3 should include at least: a function communicating with the conference server apparatus 1; a function capturing an image of user and the like; a function displaying a static/moving image; a function outputting a voice; a function accepting user's input operation; and the like.

Figure 2:
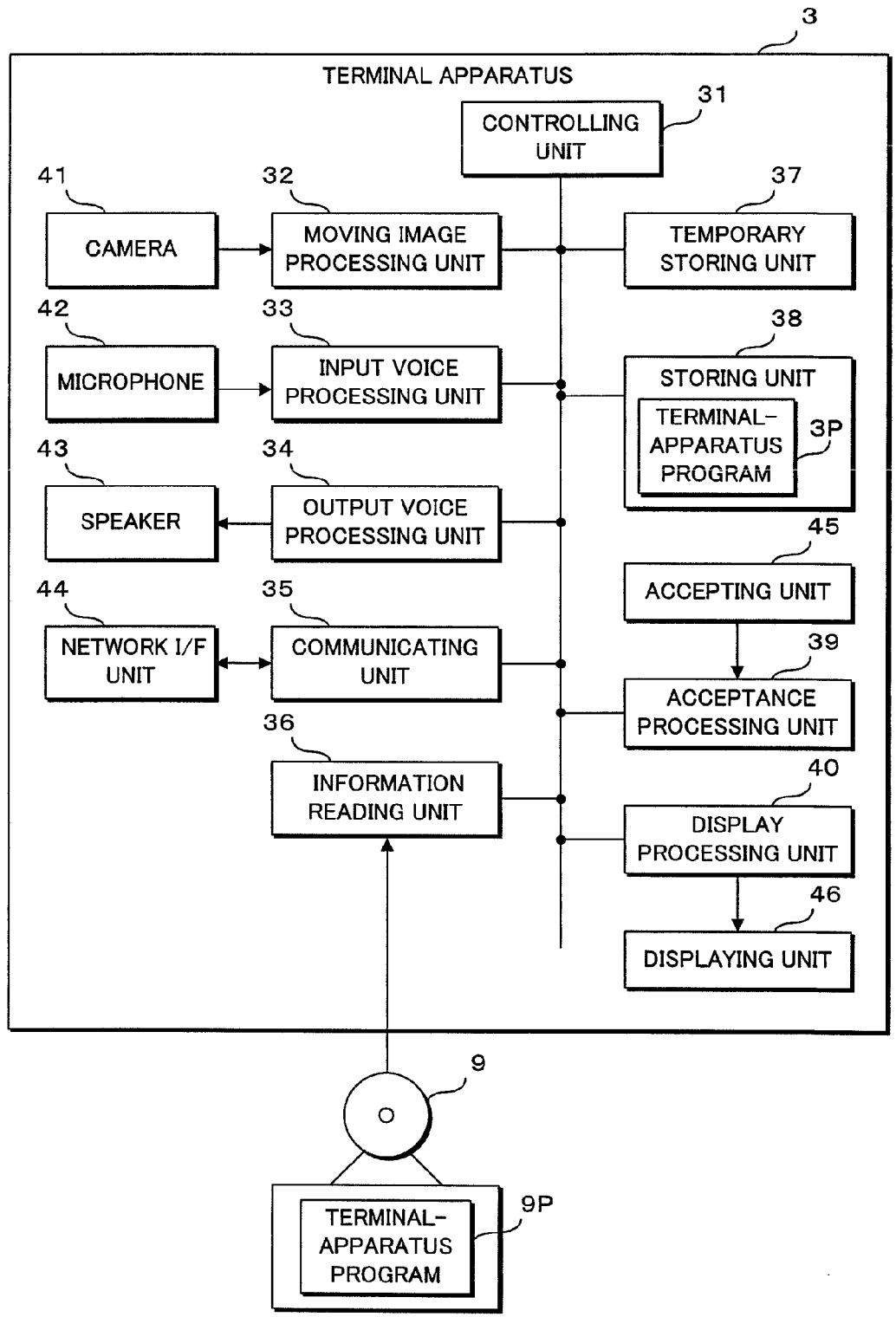
FIG. 2 is a block diagram showing components of terminal apparatus included in the teleconference system.

FIG. 2 is a block diagram showing components of terminal apparatus 3 included in the teleconference system. Although FIG. 1 illustrates that the teleconference system includes plural terminal apparatuses 3, 3, . . . having similar configurations to each other, it is not required to make all terminal apparatuses 3, 3, . . . have the same configurations. So, the teleconference system may include some types of terminal apparatus 3, and each type of terminal apparatus 3 may be configured with components different from the other types of terminal apparatus 3. In addition, the terminal apparatus 3 may be dedicated for such a teleconference or may be made for a general purpose computer.

The terminal apparatus 3 included in the teleconference system is configured with a controlling unit 31, a moving image processing unit 32, an input voice processing unit 33, an output voice processing unit 34, a communicating unit 35, an information reading unit 36, a temporary storing unit 37, a storing unit 38, an acceptance processing unit 39, a display processing unit 40 and the like. In addition, the terminal apparatus 3 includes or is externally connected to a camera 41, a microphone 42, a speaker 43, a network I/F (interface) unit 44, an accepting unit 45, a displaying unit 46 and the like.

The controlling unit 31 is an arithmetic processing apparatus, particularly a CPU (central processing unit), a MPU (micro processing unit) or the like. The controlling unit 31 reads out a terminal-apparatus program 3P, which is previously stored in the storing unit 38, onto the temporary storing unit 37 and executes the read terminal-apparatus program 3P, to control each component of the terminal apparatus 3 and thus to perform several processing for the teleconference. Because of the controlling unit 31 executing the terminal-apparatus program 3P, the terminal apparatus 3 can work as the information processing apparatus according to the present invention.

The temporary storing unit 37 is configured with a memory device, such as a SRAM (static random access memory) or a DRAM (dynamic random access memory), and stores several information generated during processing performed by the controlling unit 31. The storing unit 38 is a storage device, such as a hard disk or a SSD (solid state drive), and stores a terminal-apparatus program 3P for implementing the teleconference system, as well as an OS (operating system: not shown), several application software and the like.

The acceptance processing unit 39 is connected to the accepting unit 45, such as a pen tablet for accepting user's input operation, a pointing device consisting of a mouse, a touch screen or the like, and a keyboard. The accepting unit 45 outputs a signal to the acceptance processing unit 39, in accordance with user's input operation. The signal output from the accepting unit 45 is input into the acceptance processing unit 39, and the acceptance processing unit 39 processes the input signal, identifies the presence and the content of user's input operation (for example, information about push of button, or information about coordinate of position where input operation is performed on the display screen), and notifies the identification results to the controlling unit 31. The controlling unit 31 can perform processing in accordance with the notification results from the acceptance processing unit 39.

The display processing unit 40 is connected to the displaying unit 46, such as a liquid crystal display. The displaying unit 46 may be a touch-screen type display device capable of detecting a contact on the device, in the case that the terminal apparatus 3 includes a pen tablet, a touch screen or the like, as the accepting unit 45 described above. The controlling unit 31 can utilize the display processing unit 40 to display a screen regarding the teleconference on the displaying unit 46.

As connected to the camera 41 provided to the terminal apparatus 3, the moving image processing unit 32 controls the camera 41 and obtains a moving image captured by the camera 41. For example, the camera 41 is arranged near the displaying unit 46 of terminal apparatus 3, captures images of user's head or user's upper body facing to the displaying unit 46 dozens of times or hundreds of times at every second, and outputs a moving image signal based on the captured image to the moving image processing unit 32. The moving image processing unit 32 may include an encoder and may convert the moving image captured by the camera 41 into data formatted by a standard, such as H.264 and MPEG (moving picture expert group).

The input voice processing unit 33 is connected to the microphone 42 provided to the terminal apparatus 3, and includes an A/D conversion function for sampling a voice collected by the microphone 42, converting the sampled voice into digital voice data, and outputting the converted voice data to the controlling unit 31. The input voice processing unit 33 may be able to perform further processing, such as a volume level adjustment and a bandwidth limitation of voice collected by the microphone 42. The input voice processing unit 33 or microphone 42 may include an echo canceller function.

The output voice processing unit 34 is connected to the speaker 43 provided to the terminal apparatus 3. The output voice processing unit 34 includes a D/A conversion function for converting voice data given by the controlling unit 31 into an analog voice signal and for outputting the converted analog voice signal to the speaker 43. The speaker 43 performs voice output processing based on the voice signal given by the output voice processing unit 34.

The communicating unit 35 is connected to the network 2 through the network I/F unit 44, and implements the communication function of terminal apparatus 3 with the network 2. The network I/F unit 44 is connected to, for example, a communication cable consisting of the network 2, and mediates signal transmission between the network 2 and the communicating unit 35. The communicating unit 35 performs processing, such as a packetization processing of several information transmitted through the network I/F unit 44 and reading processing of information from a packet. It may utilize H.323, SIP (session initial protocol), HTTP (hypertext transfer protocol) or the other communication protocol, as a protocol for utilizing the communicating unit 35 in order to transmit a moving image, a voice and the like.

The information reading unit 36 is a device, such as a disk drive that reads information from the storage medium 9 which may be a CD-ROM, DVD, blue-ray disk, memory card or the like. The controlling unit 31 utilizes the information reading unit 36 to read out data stored in the storage medium 9 and stores the read data in the temporary storing unit 37 or the storing unit 38. The storage medium 9 in this embodiment stores the terminal-apparatus program 9P for making the computer work as the information processing apparatus according to the present invention. The terminal-apparatus program 3P stored in the storing unit 38 of terminal apparatus 3 may be a copy of terminal-apparatus program 9P read out from the storage medium 9.

Figure 3:
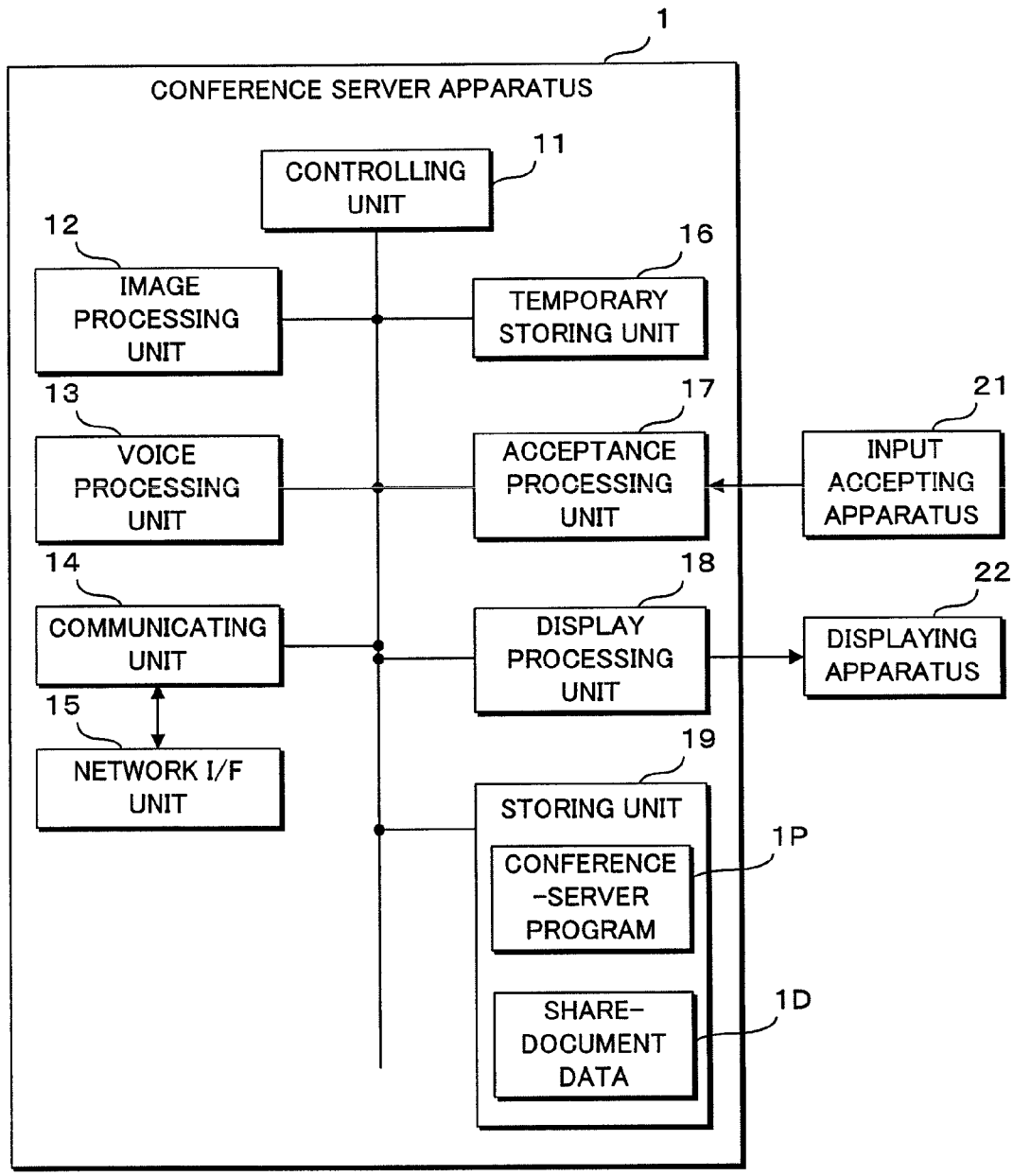
FIG. 3 is a block diagram showing components of conference server apparatus included in the teleconference system.

FIG. 3 is a block diagram showing components of conference server apparatus 1 included in the teleconference system. The conference server apparatus 1 of the teleconference system includes a controlling unit 11, an image processing unit 12, a voice processing unit 13, a communicating unit 14, a network I/F unit 15, a temporary storing unit 16, an acceptance processing unit 17, a display processing unit 18, a storing unit 19 and the like.

The controlling unit 11 is an arithmetic processing apparatus, particularly a CPU, a MPU (micro processing unit) or the like. The controlling unit 11 reads out a conference-server program 1P, which is previously stored in the storing unit 19, onto the temporally storing unit 16 and executes the read conference-server program 1P, to control each component of the conference server apparatus 1 and thus to perform several processing for the teleconference. For example, the conference server apparatus 1 is implemented by the conference-server program 1P installed into a general purpose computer. With the controlling unit 11 executing the conference-server program 1P, the conference server apparatus 1 can work for conducting the teleconference.

The temporary storing unit 16 is configured with a memory device, such as a SRAM or a DRAM, and stores several information generated during processing performed by the controlling unit 11. For example, the controlling unit 30 controls to temporary store image information described later in the temporary storing unit 16.

The storing unit 19 is a storage device, such as a hard disk or a SSD, and stores the conference-server program 1P for implementing the teleconference system, as well as an OS (not shown), several application software and the like. The conference server apparatus 1 further includes plural document data that are stored as share-document data 1D in the storing unit 19, and the plural document data are utilized for displaying, e.g., a conference material shared with respective terminal apparatuses 3 in the teleconference. The document data may be configured with several types of data in any format, such as text data, picture data and figure data. The storing unit 19 stores several other types of data as not shown, such as authentication data for authenticating users who will attend the conference.

The acceptance processing unit 17 processes an input signal obtained from an input accepting apparatus 21 (e.g., a mouse or keyboard), identifies the presence and the content of user's input operation, and notifies the identification results to the controlling unit 11. The controlling unit 11 can perform processing in accordance with the notification results obtained from the acceptance processing unit 17. In accordance with an instruction given by the controlling unit 11, the display processing unit 18 converts image data regarding a display image into an image signal suitable for displaying on a displaying apparatus 22 (e.g., liquid crystal display), outputs the converted image signal, and thus displays an image represented by the output image signal on the displaying apparatus 22.

The image processing unit 12 generates an image in accordance with the instruction given by the controlling unit 11. For example, the image processing unit 12 reads out document data to be displayed by the terminal apparatus 3 attending the teleconference, among the share-document data 1D stored in the storing unit 19, converts the read document data into a display image, and outputs the converted display image. For example, the conference server apparatus 1 receives a moving image captured by the camera 41 of terminal apparatus 3 attending the teleconference, and the image processing unit 12 performs several processing on the received moving image (and/or static image), such as scaling processing, edge enhancement processing, color adjustment processing, and composite image processing. After generated by the image processing unit 12, the image is transmitted from the conference server apparatus 1 through the network 2 to the terminal apparatus attending the teleconference.

The voice processing unit 13 can perform not only voice processing for synthesizing plural voice data received from the terminal apparatus 3 attending the teleconference, but also other voice processing, e.g., for removing a noise, for adjusting a volume of voice and the like. Therefore, the conference server apparatus 1 can synthesize several voices, such as speeches of plural users, can send the synthesized voices to respective terminal apparatuses 3, 3, . . . attending the teleconference, and can make respective terminal apparatuses 3, 3, . . . output voices regarding the teleconference from respective speakers 43, 43, . . . .

The communicating unit 14 is connected to the network 2 through the network I/F unit 15, implements the communication function of conference server apparatus 1 with the network 2. The network I/F unit 15 is connected to, for example, a communication cable consisting of the network 2, and mediates signal transmission between the network 2 and the communicating unit 14. The communicating unit 14 performs processing, such as a packetization processing of several information transmitted through the network I/F unit 15 and reading processing of information from a packet. It may utilize H.323, SIP, HTTP or the other communication protocol, as a protocol for utilizing the communicating unit 14 in order to transmit a moving image, a voice and the like.

When a user wants to attend a teleconference in the teleconference system of this embodiment, the user utilizes the accepting unit 45 of terminal apparatus 3 to perform input operation and instructs to activate the application (i.e., execute the terminal-apparatus program 3P) for conducting the teleconference. The displaying unit 46 displays a screen for inputting authentication information after the application utilized for the teleconference is activated, and then the user can input own authentication information (e.g., user ID [identifier] and password) to the screen. The terminal apparatus 3 accepts the authentication information input by the user through the acceptance processing unit 39, transmits the accepted authentication information to the conference server apparatus 3 and receives the authentication results. At that time, identification information is transmitted to the conference server apparatus 1 together with the authentication information. The identification information may be an IP address assigned to the terminal apparatus 3. Thus, the conference server apparatus 1 can identify the terminal apparatus 3 attending the teleconference, in reference with the identification information.

When approved to attend the teleconference through the authentication processing performed by the conference server apparatus 1, the terminal apparatus 3 displays a main screen for the teleconference application on the displaying unit 46. Therefore, a user can utilize the terminal apparatus 3 as a terminal device dedicated for the teleconference, and can attend the teleconference. When not approved to attend the teleconference through the authentication processing performed by the conference server apparatus 1, the terminal apparatus 3 may display a message indicating non-approval on the displaying unit 46.

Figure 4:
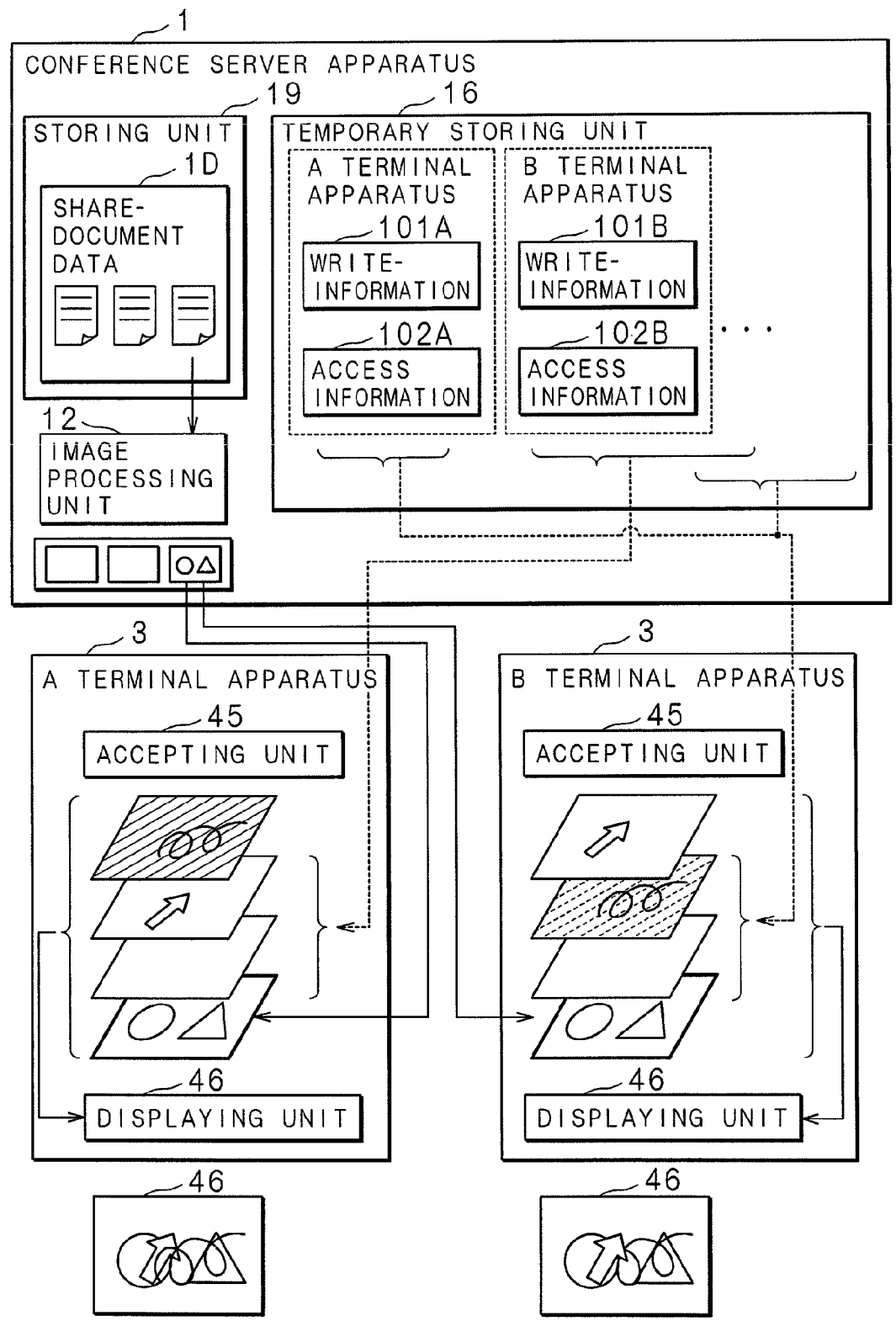
FIG. 4 is a schematic view to explain share-document data in the teleconference system.
Figure 7A:
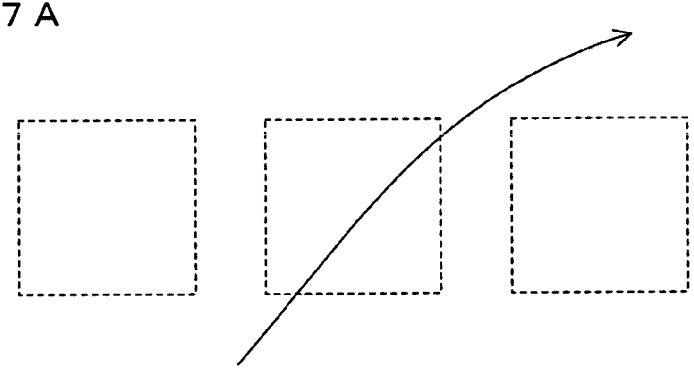
FIG. 7A, FIG. 7B and FIG. 7C are schematic views to explain redrawing a line written over the write-inhibition area.
Figure 7B:
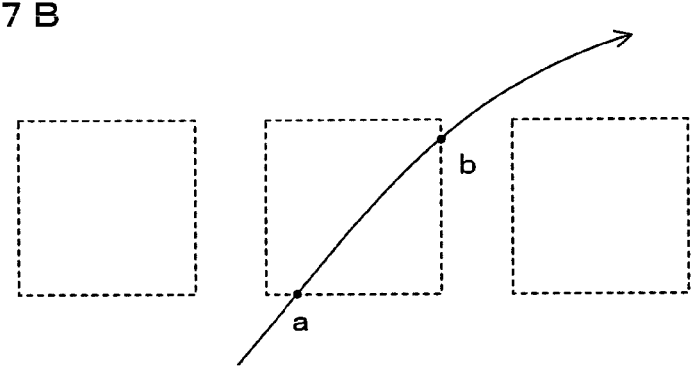
Figure 7C:
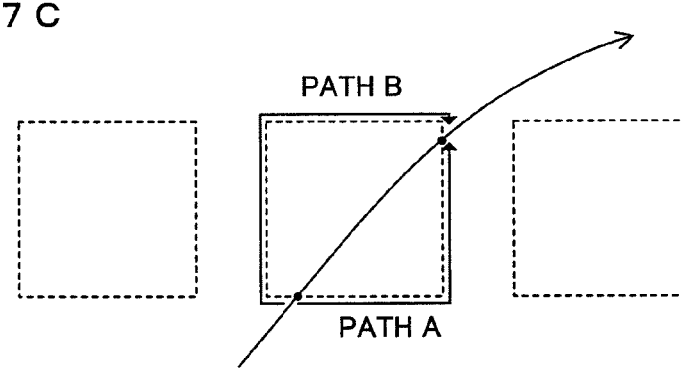
Figure 8A:
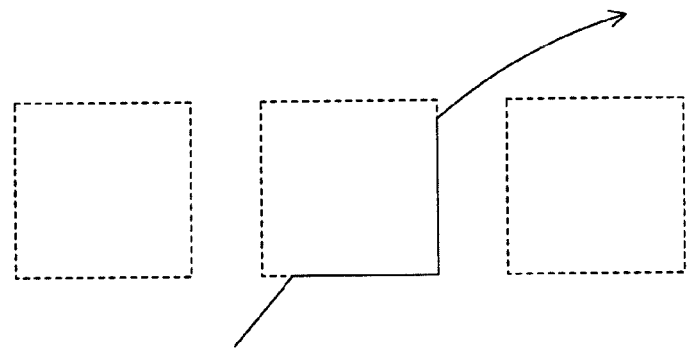
FIG. 8A, FIG. 8B and FIG. 8C are schematic views to explain redrawing a line written over the write-inhibition area.
Figure 8B:
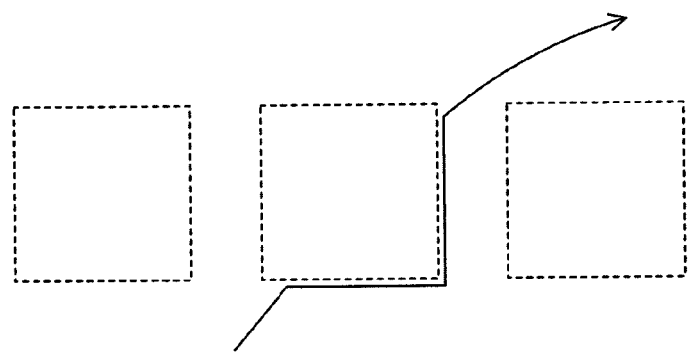
Figure 8C:
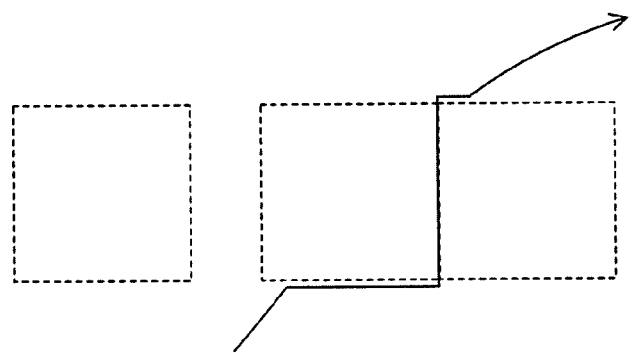

As approved to attend the teleconference through the authentication processing, the terminal apparatus 3 can display the document data, such as conference materials, transmitted from the conference server apparatus 1. Hereinafter, it will be described how such document data is shared with plural terminal apparatuses 3, 3, . . . and how the teleconference is implemented. FIG. 4 is a schematic view to explain share-document data in the teleconference system. FIG. 4 illustrates an example case that the document data is shared with two terminal apparatuses (refer to "A terminal apparatus 3" and "B terminal apparatus 3" for explanation purpose).

An organizer of teleconference previously books the teleconference through the conference server apparatus 1 and further registers materials to be utilized for the conference into the conference server 1. The materials registered into the conference server apparatus 1 are document data configured with text data, image data and the like. The materials may be generated with several data format, such as text file format, image file format, and presentation software file format. The conference server apparatus 1 stores the document data registered by the organizer as the share-document data 1D.

The conference server apparatus 1 selects document data to be utilized for the teleconference from the share-document data 1D stored in the storing unit 19, utilizes the image processing unit 12 to convert each page of selected document data into an image, and utilizes the communicating unit 14 to transmit the converted image to all terminal apparatuses 3, 3, . . . (i.e., the A terminal apparatus 3 and the B terminal apparatus 3) attending the teleconference through the network 2.

As attending the teleconference, the A terminal apparatus 3 and the B terminal apparatus 3 receive images regarding each page of document data from the conference server apparatus 1, and utilizes the display processing unit 40 to output the received images for displaying the received images on the displaying unit 46. Then, the display processing unit 40 makes the received images regarding each page of share-document data belong to a lowermost layer of display screen (shown by bold lines in FIG. 4), in order to draw a display screen image.

In addition, the A terminal apparatus 3 and the B terminal apparatus 3 can accepts writing operation, such as a memo written by a user with the accepting unit 45 consisting of pen tablet, mouse or the like. The controlling unit 31 of each terminal apparatus 3 generates a write-image in accordance with the writing operation accepted by the acceptance processing unit 39, and utilizes the display processing unit 40 to output the generated write-image for displaying the generated write-image on the displaying unit 46. At that time, the display processing unit 40 makes the generated write-image belong to an uppermost layer of display screen, in order to draw the display screen image.

Furthermore, the A terminal apparatus 3 and the B terminal apparatus 3 respectively transmit such write-images generated in accordance with the writing operation (such as a memo) toward the conference server apparatus 1. The transmitted write-images are treated as write-information that are configured with format information about type, color, line thickness, line texture, coloring, and the like, coordinate information and the like.

The conference server apparatus 1 receives the write-information sent from each terminal apparatus 3, and stores the received write-information in the temporary storing unit 37. It is preferable to save the stored write-information of the temporary storing unit 37 into the storing unit 38, periodically. Alternatively, the conference server apparatus 1 may stores the received write-information directly in the storing unit 38. When storing the received write-information, the conference server apparatus 1 associates the received write-information with the source terminal apparatus 3 that has transmitted this received write-information. In FIG. 4, information of the write-image generated by the A terminal apparatus 3 is represented by write-information 101A in association with information "A terminal apparatus" identifying the A terminal apparatus 3. Similarly, information of the write-image generated by the B terminal apparatus 3 is represented by write-information 101B in association with information "B terminal apparatus" identifying the B terminal apparatus 3.

As discriminating the stored write-information on the basis of transmitting source (i.e., each terminal apparatus 3), the conference server apparatus 1 transmits the write-information 101A to a terminal apparatus 3, and the write-information 101B to another terminal apparatus 3. In other words, the write-information 101A regarding the A terminal apparatus 3 is transmitted from the conference server apparatus 1 to the B terminal apparatus 3, and the write-information 101B regarding the B terminal apparatus 3 is transmitted from the conference server apparatus 1 to the A terminal apparatus 3.

Each terminal apparatus 3 generates an image based on the write-information of another terminal apparatus 3 transmitted from the conference server apparatus 1, and displays the generated image on the displaying unit 46. For example, the A terminal apparatus 3 generates an image based on the write-information 101B of the B terminal apparatus 3 transmitted from the conference server 1 and displays the generated image on the displaying unit 46. And, the generated image based on the B terminal apparatus 3 is drawn on a layer between the lowermost layer to which the images regarding each page of shared document data belong and the uppermost layer to which the write-image of the A terminal apparatus 3 belongs. The B terminal apparatus 3 is configured similar to the A terminal apparatus 3.

Therefore, as shown at the bottom of FIG. 4, not only the A terminal apparatus 3 but also the B terminal apparatus 3 can display the write-image that is written by other terminal apparatus 3 over the image of shared document data, and can display the write-image provided by own accepting unit 45 at the uppermost layer.

In addition, each terminal apparatus 3 periodically transmits access information to the conference server apparatus 1, as the access information for identifying data and page of images currently displayed (accessed) by each terminal apparatus 3 among the share-document data 1D. The conference server apparatus 1 stores the access information transmitted from each terminal apparatus 3 in the temporary storing unit 16, in association with the transmitting source (i.e., each terminal apparatus 3). In the example illustrated by FIG. 4, information regarding images displayed by the A terminal apparatus 3 is represented by access information 102A in association with information "A terminal apparatus" identifying the A terminal apparatus 3. Similarly, information regarding images displayed by the B terminal apparatus 3 is represented by access information 102B in association with information "B terminal apparatus" identifying the B terminal apparatus 3. The access information 102A, as well as the access information 102B may be based on a composite image of all layers in each terminal apparatus 3. Because the conference server apparatus 1 stores information indicating the data and page of images currently displayed by each terminal apparatus 3, the conference server apparatus 1 can synchronize all terminal apparatuses 3, 3, . . . attending the teleconference, and thus can control to make all terminal apparatuses 3, 3, . . . display images based on the same page at the same time.

As described above, images of document data (e.g., conference materials) are shared with plural terminal apparatuses 3, 3, . . . , each terminal apparatus 3 accepts the writing operation and then displays the write-image on the shared images of document data. Furthermore, each terminal apparatus 3 can share and display the write-image generated by other terminal apparatus 3. A user attending the teleconference can utilize the terminal apparatus 3 to access the share-document data, to show own memo to other users attending the teleconference, and to access memo shown by other users attending the teleconference. Furthermore, it is possible to transmit a moving image captured by the camera of each terminal apparatus 3, voice collected by the microphone 42 of each terminal apparatus 3 toward other terminal apparatus 3 through the conference server apparatus 1. Thus, it is possible to output the moving image and voice received by each terminal apparatus 3. Therefore, it is possible to implement the teleconference share-document data (e.g., conference materials), moving images and voices of user and the like.

In the teleconference system according to this embodiment, each terminal apparatus 3 displays the share-document data (e.g., conference materials) transmitted from the conference server apparatus 1 on the lowermost layer of displaying unit 46, accepting the writing operation performed by a user with the pen tablet or mouse of accepting unit 45, and displays the write-image on the uppermost layer of displaying unit 46. In other words, the write-image is overlaid as the uppermost layer on the displaying unit 46. Therefore, a user can freely write/add memo to the share-document data. However, in the case that a user performs the writing operation to document data including character information (sentence/text), the write-image based on the user's writing operation may be displayed over a part of sentence/text. Therefore, such a case may cause reducing the visibility and/or the readability of the sentence/text.

FIG. 5A, FIG. 5B and FIG. 5C are schematic views showing examples about writing operation performed by a user. FIG. 5A illustrates a part of sentence included in the document data displayed by the displaying unit 45 of terminal apparatus 3. FIG. 5B illustrates user's writing operation performed onto the sentence illustrated by FIG. 5A. In the case that a user tries to write something on a sentence included in document data, the user often adds/writes a leader line from a important point of the sentence to a margin portion around the sentence, and adds/writes a memo (such as a character, a word, and a figure) at the end of leader line. In the example of FIG. 5B, such a leader line is added/written from a Japanese character string "データ" in the sentence to the margin portion, and a star-shaped figure is added/written at the end of leader line. A write-image is generated in response to user's writing operation, and the generated write-image (i.e., the leader line and the star-shaped figure in the case of FIG. 5B) is displayed on a layer upper than the layer to which the sentence of document data belongs. Thus, the leader line of write-image is displayed over a character "在" in the sentence. Hence, the visibility and/or the readability of "在" is reduced.

Therefore, when a user writes something on a character or a word of sentence included in document data, the terminal apparatus 3 according to this embodiment is provided with a function preventing the reduction of visibility and/or the readability for the sentence, which relocates the write-image displayed on the character or the word to a portion displaying no character and no word of sentence and displays the relocated write-image (i.e., redraw the write-image). In the example of FIG. 5C, the leader line passing over the character "在" of sentence is redrawn to pass around the character "在". Thus, the displayed write-image is not overlaid on the character "在". Therefore, it is possible to improve the visibility and/or the readability of sentence.

In order to perform the redrawing processing on the write-image as described above, the terminal apparatus 3 firstly separates characters and/or words configuring the sentence included in the document data that has been transmitted from the conference server apparatus 1. In the case that characters included in the document data are treated as image data, the terminal apparatus 3 can utilize a conventional character recognition technique to recognize characters based on images, can obtain information about type, size and display position of character, and can separate characters and/or words from each other. On the contrary, the terminal apparatus is not required to perform the character recognition processing, in the case that the document data is in a file format for a software, such as word processor software and presentation software, and includes character code information, and that the conference server apparatus 1 transmits data including such character code information toward the terminal apparatus 3.

Next, the terminal apparatus 3 sets a write-inhibition area to the sentence of document data. In the write-inhibition area, user's writing operation is inhibited. FIG. 6A and FIG. 6B are schematic views showing examples of write-inhibition area set on the example sentence shown in FIG. 5A, and the write-inhibition areas are represented with rectangular frames. The terminal apparatus 3 calculates a rectangular area circumscribing each character in the sentence, in accordance with the information (about type, size and display position of character) obtained from the document data. Then, the terminal apparatus 3 sets the inside region of calculated rectangular area as the write-inhibition area (see FIG. 6A).

The terminal apparatus 3 may further set the write-inhibition area for each word in the sentence (see FIG. 6B). For setting the write-inhibition area for each word in the sentence, the terminal apparatus 3 is configured to prepare dictionary data that is information for a character string treated as a word, to previously store the prepared dictionary data in the storing unit 38, and to determine whether or not the dictionary data includes a character string configured with a character obtained by the character recognition processing and other characters around the obtained character. In the case that plural characters can be treated as one word, the terminal apparatus 3 prepares a rectangular area circumscribing this word and sets the prepared rectangular area as the write-inhibition area. Thus, when the terminal apparatus 3 has redrawn the leader line written by a user, the redrawn leader line does not pass over the word that does not look separated by the leader line. In the case that a word included in the dictionary data is displayed but looks separated by a line feed and the like, the terminal apparatus 3 flexibly sets the write-inhibition area for the separated word in accordance with the separation.

Next, the terminal apparatus 3 monitors user's writing operation. When a user writes something onto the write-inhibition area that is set on the document data, the terminal apparatus 3 redraws the write image that is written on the set write-inhibition area. Particularly, when a user utilizes the accepting unit 45 (e.g., a pen tablet or a mouse) to perform the writing operation, the terminal apparatus 3 utilizes the acceptance processing unit 39 to accept the user's writing operation, monitors information regarding the write-image based on the accepted writing operation, such as writing mode information and writing position information. Thus, the terminal apparatus 3 can detect the trace of written things based on the user's writing operation. When determining in accordance with the detected trace that the user writes/adds a line, such as the leader line, and that this written/added line passes over the write-inhibition area, the terminal apparatus 3 redraws the determined line that passes over the write-inhibition area.

FIG. 7A-FIG. 11C are schematic views to explain redrawing a line written over the write-inhibition area. The write-inhibition area is represented by a dashed rectangular frame, and the written line and the redrawn line are represented by solid lines. When the terminal apparatus 3 detects the trace of something written by a user and then determines that a line is written over the write-inhibition area (see FIG. 7A), the terminal apparatus 3 redraws the written line. For the explanation purpose, intersections of the periphery of write-inhibition area and the written line are referred to herein as a point A and a point B (see FIG. 7B). The terminal apparatus 3 replaces a line segment from the point A to the point B, which passes inside the write-inhibition area, with a different line segment (alternative line segment) that passes along the periphery of write-inhibition area. Two paths can be considered about the path connecting the point A to the point B along the periphery of write-inhibition area, as shown in FIG. 7C (i.e., an anticlockwise [counterclockwise] path A and a clockwise path B). In this case, the terminal apparatus 3 selects the path A as the path of alternative line segment, because the path A is shorter than the path B. Then, the terminal apparatus 3 redraws the written line to be an alternative line on the displaying unit 46, in which line segments of the written line outside the write-inhibition area is connected to an alternative line segment that is a polygonal line extending from the point A to the point B along the periphery of write-inhibition area (see FIG. 8A).

As described above, the write-inhibition area is set to contact the end portion of character or word included in the sentence. Thus, when the alternative line segment along the write-inhibition area is drawn just on the border line of write-inhibition area, the displayed character or word may contact the displayed alternative line segment and then the visibility and/or the readability may be reduced. In view of such a case, the terminal apparatus 3 may draw the alternative line at a position separated away from the periphery of write-inhibition area by a predetermined distance (e.g., several dots; see FIG. 8B). Alternatively, the terminal apparatus 3 may set the bit for drawing the alternative lines little larger (e.g., a few bits larger) than the bit for drawing character or word by several bits.

For example, there is a case that a write-inhibition area of character or word is located to contact, without a gap, to another write-inhibition area of adjacent character or word, although depending on the setting of character pitch in the sentence. In this case, the terminal apparatus 3 may draw the alternative line at a position separated from the periphery of write-inhibition area by a predetermined length, when a surrounding region of write-inhibition area is quite free. On the contrary, the terminal apparatus 3 may draw the alternative line on the border line of write-inhibition area, when a surrounding region of write-inhibition area is quite crowded (i.e., where the write-inhibition area contacts another adjacent write-inhibition area; see FIG. 8C).

Figure 9A:
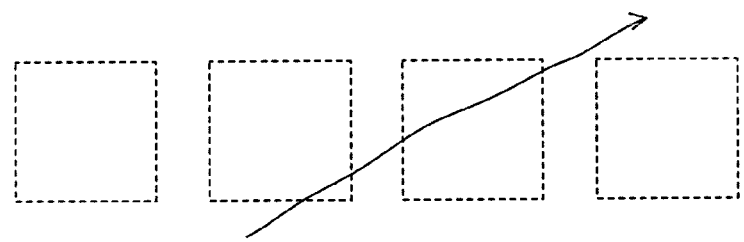
FIG. 9A, FIG. 9B and FIG. 9C are schematic views to explain redrawing a line written over the write-inhibition area.
Figure 9B:
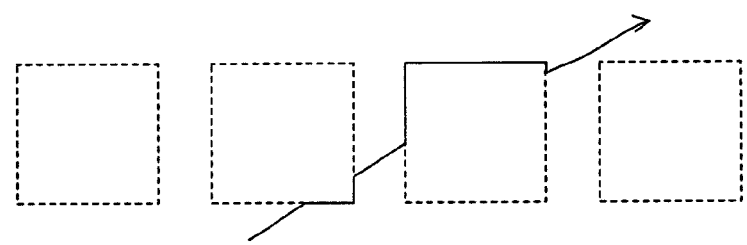
Figure 9C:
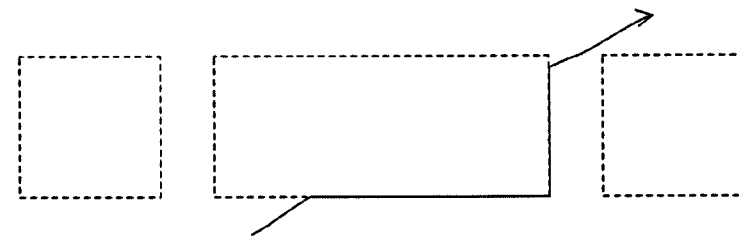

When a user writes/adds a line, the terminal apparatus 3 performs processing described above for all write-inhibition areas over which the line written/added by the user passes. For example, when a user writes/adds a line passing over two write-inhibition areas as shown in FIG. 9A, the terminal apparatus 3 replaces the line segments passing within the write-inhibition areas with alternative line segments passing along the periphery of write-inhibition areas, respectively (see FIG. 9B). In the case that characters of these two write-inhibition areas make one word, the terminal apparatus 3 may set one write-inhibition area for this one word, to draw the alternative line pass around this one word as shown in FIG. 9C.

When a user writes/adds plural lines each of which passes over a write-inhibition area, the terminal apparatus 3 similarly performs processing described above for each line. For example, when a user writes/adds two leader lines on the sentence displayed in plural rows, one of written/added leader lines passes upward and leftward from a word in the middle row and passes over a write-inhibition area and the other one of written/added leader lines passes upward and rightward from the word in the middle row and passes over another write-inhibition area as shown in FIG. 10A, the terminal apparatus 3 can utilize the procedure described above for preparing alternative line segments having shorter paths for respective leader lines, and can redraw the written/added leader lines to be lines passing around characters or words, respectively, as shown in FIG. 10B.

Figure 11A:
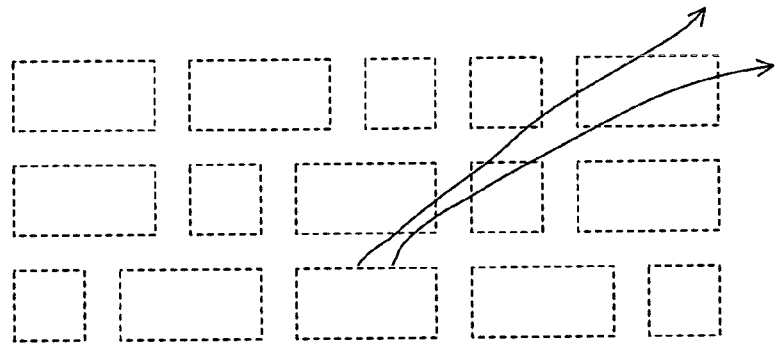
FIG. 11A, FIG. 11B and FIG. 11C are schematic views to explain redrawing a line written over the write-inhibition area.
Figure 11B:
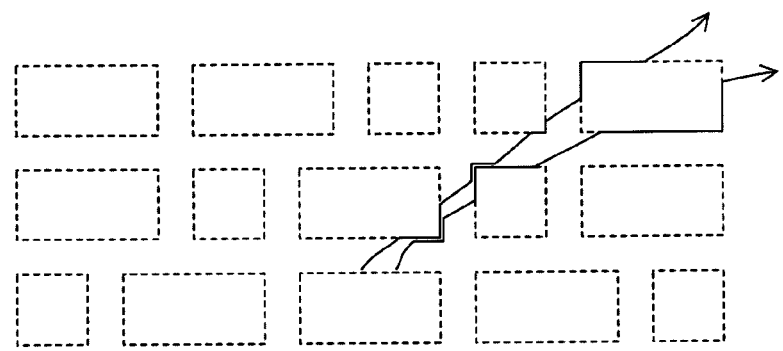
Figure 11C:
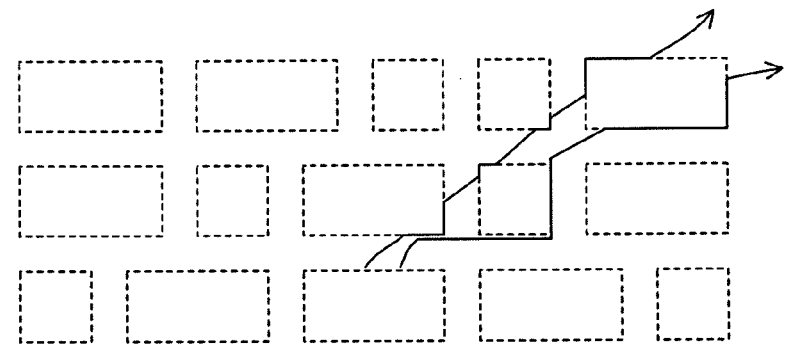

On the other hands, when both of two leader lines pass upward and rightward and pass over the same write-inhibition area as shown in FIG. 11A, the procedure described above prepares alternative line segments, and further the prepared alternative line segment having shorter path for one leader line will overlay on the prepared alternative line segment having shorter path for the other leader line as shown in FIG. 11A, the terminal apparatus 3 draws one alternative line segment at a position separated from the other alternative line segment by a predetermined length (e.g., a few bits; see FIG. 11B). In the case that many alternative segments overlay on each other or the surrounding region of write-inhibition area does not have margin space for keeping a proper distance between these alternative segments, the terminal apparatus 3 may redraw any one of these leader lines to pass along the periphery of adjacent write-inhibition area. The leader line to be redrawn for passing along the periphery of adjacent write-inhibition area may be selected in accordance with the order of lines written/added by the user or in accordance with the position of lines written/added by the user.

Figure 12:
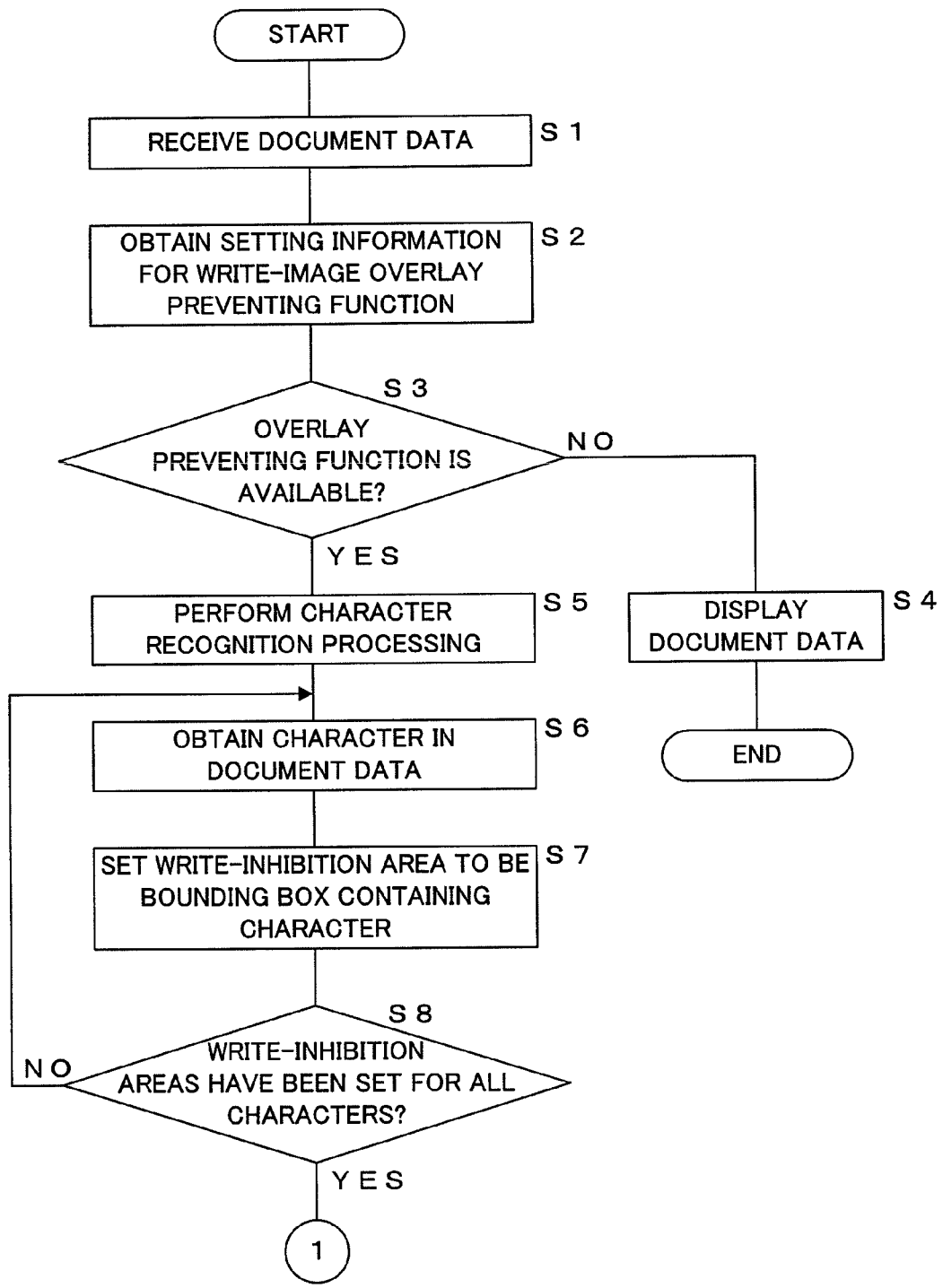
FIG. 12 is a flowchart showing a procedure about a setting operation of write-inhibition area performed by a terminal apparatus.
Figure 13:
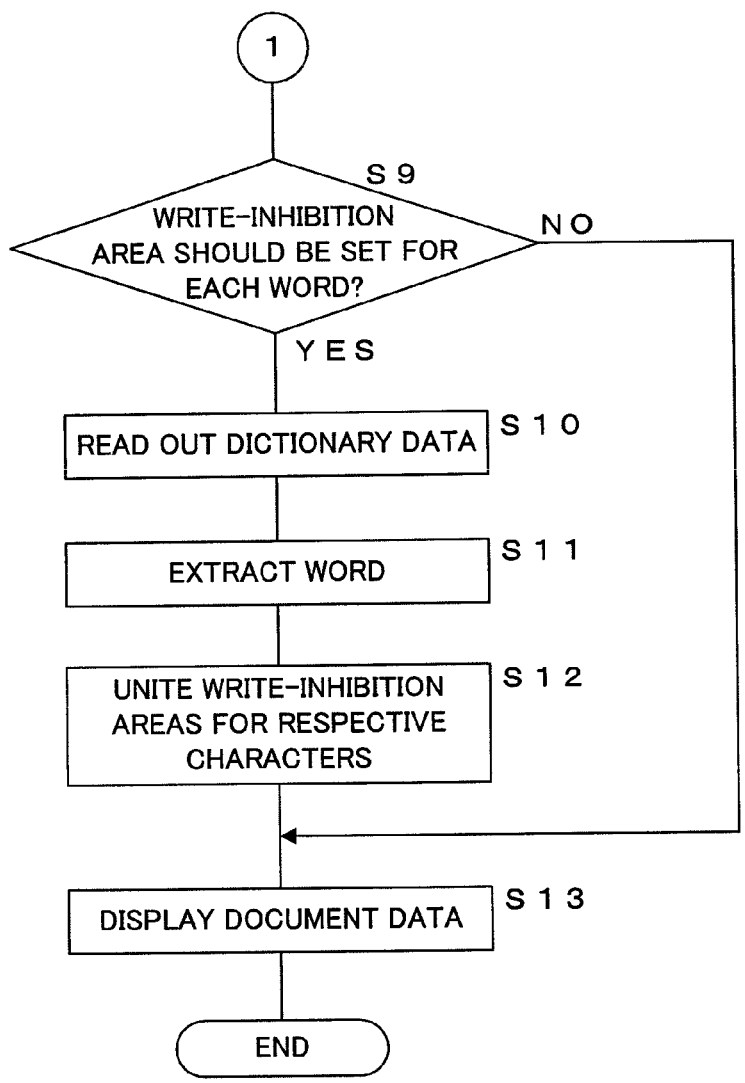
FIG. 13 is a flowchart showing a procedure about the setting operation of write-inhibition area performed by the terminal apparatus.

FIG. 12 and FIG. 13 are flowcharts showing a procedure about a setting operation of write-inhibition area performed by the terminal apparatus 3, particularly by the control unit 31 of terminal apparatus 3 executing the terminal-apparatus program 3P. The controlling unit 31 of terminal apparatus 3 firstly utilizes the communicating unit 35 to receive the share-document data transmitted from the conference apparatus 1 (step S1). A user can select to utilize or not the function for preventing the write-image (line) from overlaying on a character or word included in the sentence. The controlling unit 31 of terminal apparatus 3 obtains setting information for the function preventing the overlay (step S2), and determines whether the overlay preventing function is set to be available or not (step S3). When having determined that the overlay preventing function is not set to be available (S3: NO), the controlling unit 31 utilizes the display processing unit 40 to display the document data received at the step S1 on the displaying unit 46 (step S4), and completes the procedure.

When having determined that the overlay preventing function is set to be available (S3: YES), the controlling unit 31 performs the character recognition processing on the document data received at the step S1 (step S5), and divides the document data into characters and the other elements. The controlling unit 31 obtains a character included in the document data (step S6), calculates and generates a rectangular area contacting to the end portion of this obtained character, sets the generated rectangular area as the write-inhibition area for this obtained character (step S7). The controlling unit 31 determines whether write-inhibition areas have been set for all characters included in the document data or not (step S8). When having determined that write-inhibition areas have not been set for all characters yet (S8: NO), the controlling unit 31 returns the procedure to the step S6 and starts to obtain another character.

When having determined that write-inhibition areas have been set for all characters (S8: YES), the controlling unit 31 refers the setting information regarding the overlay preventing function, and then determines whether the write-inhibition area should be set for each word or not (step S9). When having determined that the write-inhibition area should not be set for each word (S9: NO), the controlling unit 31 completes the processing for setting the write-inhibition area for each character, utilizes the display processing unit 40 to display the document data received at the step S1 on the displaying unit 46 (step S13), and completes the procedure.

When having determined that the write-inhibition area should be set for each word (S9: YES), the controlling unit 31 reads out the dictionary data previously stored in the storing unit 38 (step S10), compares a character string configured with plural characters included in the document data with words included in the dictionary data, determines whether the compared character string corresponds to a word included in the dictionary data or not, and thus extracts a word from the document data (step S11). Next, the controlling unit 31 unites the write-inhibition areas set for respective characters at the step S7 (step S12) to form and set the write-inhibition area for each word, utilizes the display processing unit 40 to display the document data received at the step S1 on the displaying unit 46 (step S13), and completes the procedure.

Figure 14:
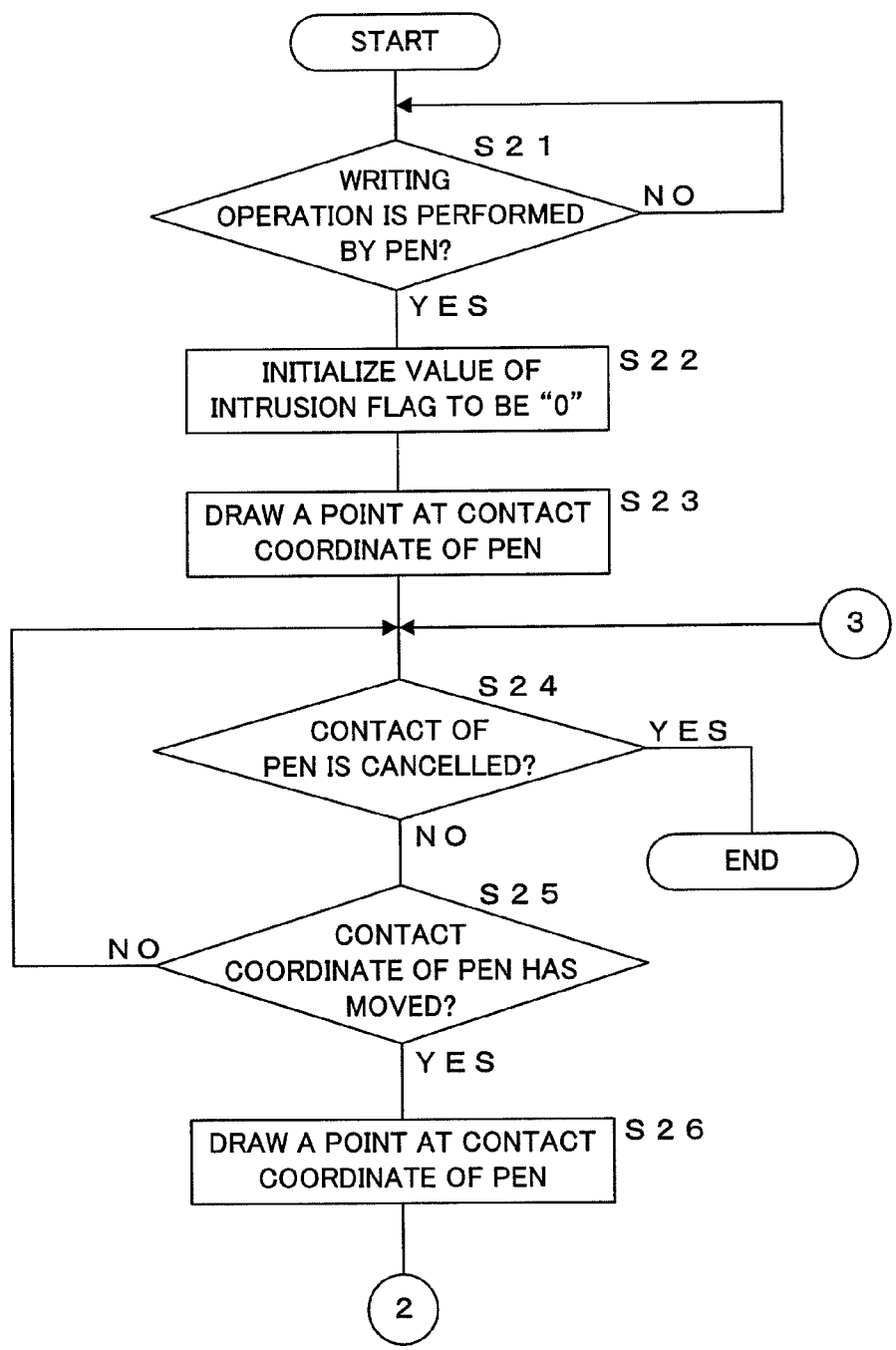
FIG. 14 is a flowchart showing a procedure performed by the terminal apparatus for accepting a writing operation.
Figure 15:
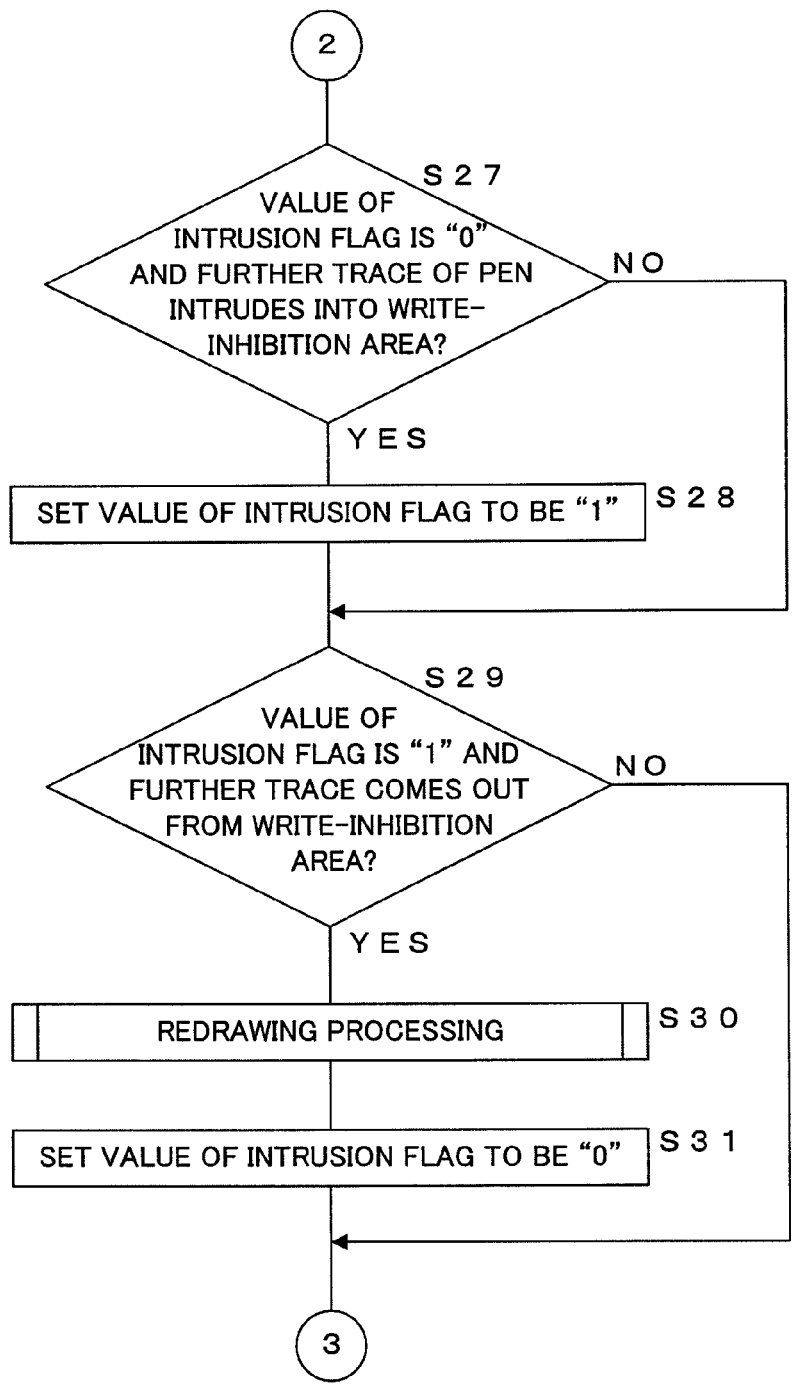
FIG. 15 is a flowchart showing a procedure performed by the terminal apparatus for accepting the writing operation.

FIG. 14 and FIG. 15 are flowcharts showing a procedure performed by the terminal apparatus 3 for accepting the writing operation, particularly performed by the controlling unit 31 of terminal apparatus 3 executing the terminal-apparatus program 3P. Although the following explanation is based on the context of the terminal apparatus 3 provided with a pen tablet as the accepting unit 45, similar explanation can be done for the context of terminal apparatus 3 provided with a mouse, a touch screen or the like for accepting the input as the accepting unit 45. In addition, a parameter "intrusion flag" is utilized in these flowcharts. The terminal apparatus 3 utilizes a memory area, such as a register in the temporary storing unit 37 or in the controlling unit 31, to implement this parameter "intrusion flag" that is configured to store "0" or "1".

The controlling unit 31 of terminal apparatus 3 utilizes the acceptance processing unit 39 to determine whether a writing operation is performed by a pen included in the pen tablet or not (step S21). When having determined that the writing operation is not performed yet (S21: NO), the controlling unit 31 waits until determining that the writing operation is performed. When having determined that the writing operation is performed (S21: YES), the controlling unit 31 initializes the value of intrusion flag to be "0" (step S22), and displays (draws) a point corresponding to a contact coordinate of pen included in the pen tablet onto the displaying unit 46 (step S23).

Next, the controlling unit 31 determines whether the contact of pen included in the pen tablet is cancelled or not (step S24). When having determined that the contact is not cancelled (S24: NO), the controlling unit 31 determines whether the contact coordinate of pen has moved or not (step S25). When having determined that the contact is cancelled (S24: YES), the controlling unit 31 completes the procedure. When having determined that the contact coordinate of pen has not moved yet (S25: NO), the controlling unit 31 returns the procedure to the step S24 and waits until determining that the contact of pen is cancelled or the contact coordinate moves.

When having determined that the contact coordinate of pen has moved (S25: YES), the controlling unit 31 draws a point corresponding to the contact coordinate of pen that has moved (step S26). Next, the controlling unit 31 determines whether or not the value of intrusion flag is "0" and further the trace of pen intrudes into the write-inhibition area (step S27). When having determined that the value of intrusion flag is "0" and further the trace of pen intrudes into the write-inhibition area (S27: YES), the controlling unit 31 sets the value of intrusion flag to be "1" (step S28), and proceeds the procedure to the step S29. When having determined that the value of intrusion flag is not "0" or that the trace of pen does not intrude into the write-inhibition area (S27: NO), the controlling unit 31 proceeds the procedure to the step S29.

Next, the controlling unit 31 determines whether or not the value of intrusion flag is "1" and further the trace of pen comes out from the write-inhibition area (step S29). When having determined that the value of intrusion flag is "1" and further the trace of pen comes out from the write-inhibition area (S29: YES), the controlling unit 31 performs the redrawing processing for replacing the line segment inside the write-inhibition area with the alternative line segment and for drawing the replaced alternative line segment (step S30), sets the value of intrusion flag to be "0" (step S31), and returns the procedure to the step S24. The controlling unit 31 repeats this procedure described above, until determining that the contact of pen is cancelled. When having determined that the value of intrusion flag is not "1" or that the trace of pen does not come out from the write-inhibition area (S29: NO), the controlling unit 31 returns the procedure to the step S24 without performing the redrawing processing, and repeats the procedure described above until determining that the contact of pen is cancelled.

Figure 16:
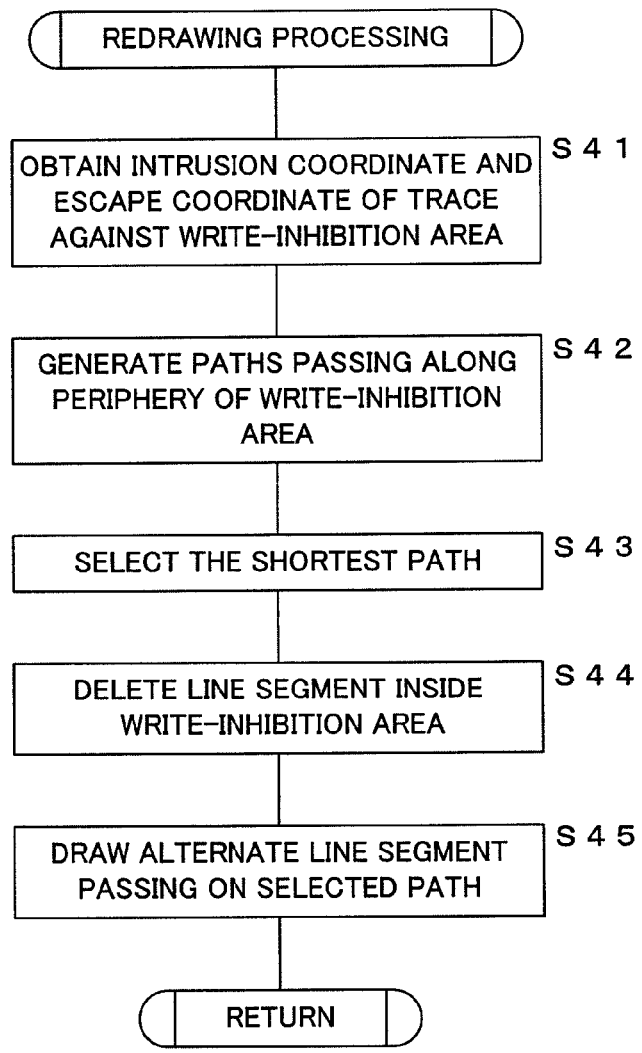
FIG. 16 is a flowchart showing a procedure about a redrawing processing performed by the terminal apparatus.

FIG. 16 is a flowchart showing a procedure about the redrawing processing performed by the terminal apparatus 3, particularly about processing performed by the controlling unit 31 of terminal apparatus 3 at the step S30 of processing for accepting the writing operation shown in FIG. 14 and FIG. 15. The controlling unit 31 of terminal apparatus 3 obtains the intrusion coordinate (see the point A in FIG. 7B) and the escape coordinate (see the point B in FIG. 7B) that are points on the trace of image written by the pen over the write-inhibition area (step S41). Next, the controlling unit 31 links the obtained intrusion coordinate and the obtained escape coordinate, and calculates and generates paths passing along the periphery of write-inhibition area (step S42). As the result, two paths are prepared (see the path A and the path B in FIG. 7C), and the controlling unit 31 selects one of two paths that is shorter than the other one (step S43). Next, the controlling unit 31 deletes the line segment displayed inside the write-inhibition area (step S44), draws the alternative line segment passing on the path selected at the step S43, instead of the deleted line segment (step S45), and completes the redrawing processing. In the case that plural alternative lines overlay on each other at that time, the controlling unit 31 may keep a gap between any two of alternative lines (see FIG. 11B) or may draw an alternative line to pass along the periphery of adjacent write-inhibition area (see FIG. 11C).

In the teleconference system described above, the document data (e.g., conference materials) can be transmitted from the conference server apparatus 1 to the terminal apparatus 3 attending the teleconference, and the terminal apparatus 3 can display the transmitted document data on the lower most layer of displaying unit 46, can utilize the accepting unit 45 (such as a pen tablet or a mouse) to accept user's writing operation performed onto the display screen of displaying unit 46, can generate the write-image regarding the accepted writing operation on the layer upper than the layer to which the transmitted document data belong, and can overlay and display the generated write-image on the document data. At that time, the terminal apparatus 3 sets the rectangular area contacting to the end portion of character or word included in the sentence of document data as the write-inhibition area. Then, when something like the leader line is written into the write-inhibition area, the terminal apparatus 3 displays the image regarding the written thing around the write-inhibition area. Therefore, it is possible to prevent the user's writing operation from reducing the visibility and/or the readability of sentence included in the document data.

When a written line passes over the write-inhibition area that is set for the document data, the terminal apparatus 3 replaces the line segment inside the write-inhibition area with the alternative line segment passing along the periphery of write-inhibition area and displays (redraws) the replaced alternative line segment. At that time, the terminal apparatus 3 can prepare the line segments connecting one end and the other end of this segment (see the point A and the point B in FIG. 7B) within the write-inhibition area, can select one of line segments that is shorter than the other one, and can set the selected line segment as the alternative line segment. The terminal apparatus 3 can draw the alternative line passing on the margin away from the write-inhibition area, since connecting the alternative line segment to the line segment located outside the write-inhibition area.

When plural lines are written to pass over the same write-inhibition area and the generated alternative lines for these plural lines overlay on each other, the terminal apparatus 3 displays any one of these alternative lines separated from the others of these alternative lines by a predetermined length. Alternatively, the terminal apparatus 3 may display at least one of these alternative lines passing along the periphery of adjacent write-inhibition area. Therefore, it is possible to prevent these alternative lines from overlaying on each other, and the visibility of user's write-image can be improved because of including such the alternative line.

Although this embodiment is explained that the terminal apparatus 3 sets the write-inhibition area for a character or word of sentence included in the document data, the present invention is not limited to such the explanation. Alternatively, the conference server apparatus 1 may be configured to set the write-inhibition area and to transmit the setting information and the share-document data to each terminal apparatus 3. Furthermore, as it is not necessary to make the terminal apparatus 3 absolutely perform the processing for redrawing the line written inside the write-inhibition area to be the alternative line, the present invention may be configured to set the availability of this redrawing processing based on user's preference.

The terminal apparatus 3 accepts user's writing operation and transmits the write-image regarding the user's writing operation to the conference server apparatus 1, and the conference server apparatus 1 receives the write image transmitted from the terminal apparatus 3 and transmits the write image further to another terminal apparatus 3. The write-image transmitted from the terminal apparatus 3 to the conference server apparatus 1 may be an image in which the line written inside the write-inhibition area has already been replaced with the alternative line as described above, or an image in which the line written inside the write-inhibition area has not yet been replaced with the alternative line. When the terminal apparatus 3 transmits the image (i.e., write-image) to the conference server apparatus 1 in which the line written inside the write-inhibition area has not yet been replaced with the alternative line, the terminal apparatus 3 may receive this write-image from the conference server 1 and then similarly perform the processing for replacing with the alternative line on this write-image.

Although illustrating the document data, the image written by a user and the redrawn image, FIG. 5 is an example and the present invention is not limited to this example. Although illustrating the set write-inhibition areas, FIG. 6 is an example and the present invention is not limited to this example. Although illustrating the written lines and the alternative lines, FIG. 7A-FIG. 11C are examples and the present invention is not limited to these examples. Although illustrating in the context of horizontally written sentences included in the document data, FIG. 5A-FIG. 11C are examples and the present invention is not limited to these examples and is available for vertically written sentences, too. Although illustrating the leader lines written upward on the display screen, FIGS. 5A-5C and FIG. 7A-FIG. 11C are examples and the present invention is not limited to these examples and is available for the leader lines written downward, too.

When it is intended to set the write-inhibition area for the sentence of document data in the present invention, the sentence is divided into words and characters and the write-inhibition area is set for each word or character. Therefore, it is possible to prevent the reduction on the readability of word or character, and possible to keep the sentence easy to read. Furthermore, it is possible to display the write-image on the margin located at the inter-word space or the inter-character space. Therefore, it is possible to display more write-images, in comparison with the case that single write-inhibition area is set just for the whole sentence.

When a user writes something over the write-inhibition area in the present invention, the information processing apparatus displays the write-image based on the user's writing operation at some position different from the position based on the user's writing operation (e.g., outside of the write-inhibition area), instead of utilizing a strategy that the write-image is not displayed. Therefore, it is possible to change the display position write-image, and display the write-image at the changed position preventing the displayed write-image from reducing the readability of sentence, while avoiding to invalidate the user's writing operation.

When two lines are written to pass over the same write-inhibition area in the present invention, the information processing apparatus displays an alternative line for one of these two lines to pass along the periphery of write-inhibition area in a direction (e.g., a clockwise direction) and displays the other alternative line for the other one of these two lines to pass along the same periphery of write-inhibition area in a different direction (e.g., an anticlockwise direction). Thus, displayed two alternative lines look separated from each other. Therefore, it is possible to prevent the displayed alternative line from overlaying on another displayed alternative line, and to improve the visibility of line written on the display screen.

As set for the sentence of document data in the present invention, the write-inhibition area is the rectangular area. Thus, when trying to write/add something to the displayed sentence, a user can easily recognize the write-inhibition areas for the displayed sentence. Hence, the user can avoid writing something inside the write-inhibition areas, as much as possible. Therefore, it is possible to reduce the frequency for replacing the line passing inside the write-inhibition area with the alternative line as described above, and further to reduce the processing load of information processing apparatus.

The write-inhibition area is the rectangle contacting to the end portion of character included in the sentence, in the present invention. Thus, it is possible to minimize the size of write-inhibition area. Therefore, it is possible to provide larger areas where a user can write something to the sentence.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information processing apparatus having a display screen, comprising:
   a displaying unit that displays a display object on the display screen;
   an adding unit that displays a line drawing on the display screen;
   a setting unit that sets a write-inhibition area for the display object displayed on the display screen; and
   a changing unit that, when the adding unit displays the line drawing positioning inside the write-inhibition area, changes a path of the line drawing positioning inside the write-inhibition area to be positioned outside the write-inhibition area on the display screen, wherein
the adding unit re-displays the path of the line drawing that has been changed by the changing unit.

2. An information processing apparatus according to claim 1, further comprising:
a word extracting unit that extracts plural words from the display object displayed by the displaying unit, wherein
the setting unit sets the write-inhibition area that covers each word extracted by the word extracting unit, and
the write-inhibition area set by the setting unit does not overlap another write-inhibition area set by the setting unit.

3. An information processing apparatus according to claim 1, further comprising:
a character extracting unit that extracts plural characters from the display object displayed by the displaying unit, wherein
the setting unit sets the write-inhibition area that covers each character extracted by the character extracting unit, and
the write-inhibition area set by the setting unit does not overlap another write-inhibition area set by the setting unit.

4. An information processing apparatus according to claim 3, wherein
the write-inhibition area is a bounding box containing the character extracted by the character extracting unit.

5. An information processing apparatus according to claim 4, further comprising:
a communicating unit that receives data of display object to be displayed by the displaying unit, wherein
the displaying unit displays the display object based on the data received by the communicating unit onto the display screen.

6. An information processing apparatus according to claim 5, wherein
the communicating unit is connected to another information processing apparatus, and transmits data of addition object to be displayed by the adding unit toward said another information processing apparatus,
after receiving the data of addition object, said another information processing apparatus overlays an image based on the data of addition object onto the display object that is displayed on own display screen.

7. An information processing apparatus according to claim 1, wherein
when a first line drawing and a second line drawing displayed by the adding unit will be positioned inside the write-inhibition area set by the setting unit, a path of the first line drawing changed by the changing unit becomes clockwise to the periphery of the write-inhibition area, and a path of the second line drawing changed by the changing unit becomes anticlockwise to the periphery of the write-inhibition area.

8. An information processing apparatus according to claim 1, wherein
when a first line drawing and a second line drawing displayed by the adding unit will be positioned inside the write-inhibition area set by the setting unit, a path of the first line drawing changed by the changing unit becomes separated farther away from the periphery of the write-inhibition area, than a path of the second line drawing changed by the changing unit.

9. An information processing apparatus according to claim 1, wherein
when the line drawing displayed by the adding unit will pass over two adjacent write-inhibition areas set by the setting unit, the changing unit changes a path of the line drawing which positions in an united area consisting of the two adjacent write-inhibition areas and of an area between the two adjacent write-inhibition areas, to be a path passing along a periphery of the united area.

10. An information processing apparatus according to claim 9, wherein
when a first line drawing and a second line drawing displayed by the adding unit will be positioned inside the two adjacent write-inhibition areas, the changing unit changes a path of the first line drawing or a path of the second line drawing which positions in an united area consisting of the two adjacent write-inhibition areas and of an area between the two adjacent write-inhibition areas, to be a path passing along a periphery of the united area.

11. An information processing apparatus according to claim 1, wherein
the write-inhibition area is a rectangular area.

12. A teleconference system provided with plural information processing apparatuses, each of which has a display screen and an adding unit that displays a line drawing on the display screen, comprising:
a displaying unit that displays a display object on the display screen of each information processing apparatus;
a setting unit that sets a write-inhibition area for the display object displayed on the display screen of each information processing apparatus; and
a changing unit that, when the adding unit displays the line drawing positioning inside the write-inhibition area, changes a path of the line drawing positioning inside the write-inhibition area to be positioned outside the write-inhibition area on the display screen of each information processing apparatus,
wherein the adding unit re-displays the path of the line drawing that has been changed by the changing unit.

13. A teleconference system according to claim 12, further comprising:
a communicating unit that transmits data of addition object displayed by the adding unit of an information processing apparatus among the plural information processing apparatuses toward another information processing apparatus among the plural information processing apparatus, wherein
after receiving the transmitted data of addition object, said another information processing apparatus overlays an image based on the data of addition object on the display object that is displayed on own display screen.

* * * * *